(12) United States Patent
Flinta et al.

(10) Patent No.: US 9,385,958 B2
(45) Date of Patent: Jul. 5, 2016

(54) METHODS AND NODES FOR IMPROVED ESTIMATION OF AVAILABLE PATH CAPACITY OF A DATA TRANSFER PATH

(71) Applicant: Telefonaktiebolaget L M Ericsson (publ), Stockholm (SE)

(72) Inventors: Christofer Flinta, Stockholm (SE); Andreas Johnsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 14/403,717

(22) PCT Filed: Nov. 13, 2012

(86) PCT No.: PCT/SE2012/051237
§ 371 (c)(1),
(2) Date: Nov. 25, 2014

(87) PCT Pub. No.: WO2013/180613
PCT Pub. Date: Dec. 5, 2013

(65) Prior Publication Data
US 2015/0195205 A1 Jul. 9, 2015

Related U.S. Application Data

(60) Provisional application No. 61/652,733, filed on May 29, 2012.

(51) Int. Cl.
*H04L 12/815* (2013.01)
*H04L 12/819* (2013.01)
(Continued)

(52) U.S. Cl.
CPC .............. *H04L 47/225* (2013.01); *H04L 43/04* (2013.01); *H04L 43/0882* (2013.01); *H04L 43/10* (2013.01); *H04L 47/115* (2013.01); *H04L 47/215* (2013.01); *H04L 47/22* (2013.01)

(58) Field of Classification Search
CPC ..... H04L 43/04; H04L 43/0882; H04L 43/10; H04L 47/115; H04L 47/215; H04L 47/22; H04L 47/225
See application file for complete search history.

(56) References Cited

U.S. PATENT DOCUMENTS

| 6,201,791 B1 * | 3/2001 | Bournas | H04L 12/2697 370/234 |
| 7,729,268 B2 * | 6/2010 | Matta | H04L 12/2602 370/252 |

(Continued)

FOREIGN PATENT DOCUMENTS

EP 2 432 170 A1 3/2012

OTHER PUBLICATIONS

European Search Report Corresponding to European Patent Application No. 12 878 150.7; Dated: Dec. 4, 2015; 9 Pages.

(Continued)

*Primary Examiner* — Ahmed Elallam
(74) *Attorney, Agent, or Firm* — Myers Bigel & Sibley, P.A.

(57) ABSTRACT

A method of estimating available capacity of a data transfer path that transfers data between a sending and a receiving data communication node of a data communication system is disclosed. The method includes: sending one or more setting packets wherein the one or more setting packets is/are used to set a traffic shaping node arranged in the data transfer path in a steady state; transmitting, from the traffic shaping node, probe packets received from the sending node, towards the receiving node at an average rate for the traffic shaping node; providing, in response to traversal of the data transfer path by the probe packets, and during the real-time operation of the data transfer path, measured data for use in estimating the available capacity of the data transfer path; and estimating the available capacity of the data transfer path using the measured data from the probe packets.

15 Claims, 5 Drawing Sheets

(51) Int. Cl.
*H04L 12/26* (2006.01)
*H04L 12/801* (2013.01)

(56) References Cited

U.S. PATENT DOCUMENTS

| | | | |
|---|---|---|---|
| 7,778,179 | B2 | 8/2010 | Ekelin et al. |
| 8,503,320 | B2 | 8/2013 | Ekelin et al. |
| 9,094,315 | B2* | 7/2015 | Baillargeon ............ H04L 43/10 |
| 2003/0005144 | A1 | 1/2003 | Engel et al. |
| 2005/0018611 | A1* | 1/2005 | Chan ..................... H04L 41/147 370/241 |
| 2010/0098414 | A1 | 4/2010 | Kramer et al. |
| 2011/0090811 | A1* | 4/2011 | Ekelin ................. H04L 12/2697 370/252 |
| 2011/0141922 | A1 | 6/2011 | Kotrla et al. |

OTHER PUBLICATIONS

Ekelin S. et al. "Continuous Monitoring of Available Bandwidth over a Network Path", Swedish National Computer Networking Workshop, XX, XX, Nov. 23, 2004.
Szymanski T.H. et al. "Internet Multicasting of IPTV With Null Essentially-Zero Delay Jitter", IEEE Transactions on Broadcasting, IEEE Service Center, Piscataway, NJ, US, vol. 55, No. 1, Mar. 1, 2009, pp. 20-30.
International Search Report, PCT Application No. PCT/SE2012/051237, Nov. 19, 2013.
Written Opinion of the International Searching Authority, PCT Application No. PCT/SE2012/051237, Nov. 19, 2013.
3GPP, Technical Specification, "3rd Generation Partnership Project; Technical Specification Group Services and System Aspects; Transparent end-to-end Packet-switched Streaming Service (PSS); Protocols and codecs (Release 10)", 3GPP TS 26.234 V10.0.0 (Mar. 2011), 18 pp.
Baillargeon et al., "Ericsson TWAMP Value-Added Octets", *Draft-ietf-ippm-twamp-value-added-octets-09-Ericsson Two-Way Active Measurement Protocol (TWAMP) Value-Added Octets*. Internet Engineering Task Force (IETF), Sep. 26, 2012. Web. <https://tools.ietf.org/html/draft-ietf-ippm-twamp-value-added-octets-09>. 18 pp.
Bechtel et al., "Available Bandwidth Measurements in Environments with QoS Support", Master of Science Thesis, The Royal Institute of Technology (KTH), Stockholm, Jun. 16, 2010, 117 pp.
Bergfeldt, "Available-Bandwidth Estimation in Packet-Switched Communication Networks", Linköping Studies in Science and Technology, Dissertations, No. 1348, Linköping University Institute of Technology, Norrköping, Available from Oct. 28, 2010 / Public defense—Nov. 26, 2010, 174 pp.
Chimento et al., "RFC 5136—Defining Network Capacity", Internet Engineering Task Force (IETF), Feb. 2008. Web. <https://tools.ietf.org/html/rfc5136>, 14 pp.
Croce et al., "Large-Scale Available Bandwidth Measurements: Interference in Current Techniques", *IEEE Transactions on Network and Service Management*, vol. 8, No. 4, Dec. 2011, pp. 361-374.
Doucet et al., "A Tutorial on Particle Filtering and Smoothing: Fifteen years later", in *Oxford Handbook of Nonlinear Filtering*, Version 1.1, Dec. 2008, 37 pp.
Ekelin et al., "Real-Time Measurement of End-to-End Available Bandwidth using Kalman Filtering", *NOMS 2006—10th IEEE/IFIP Network Operations and Management Symposium*, Vancouver, BC, Apr. 3-7, 2006, pp. 73-84.
Hedayat et al., "RFC 5357—A Two-Way Active Measurement Protocol (TWAMP)", Internet Engineering Task Force (IETF), Oct. 2008. Web. <https://tools.ietf.org/html/rfc5357>, 26 pp.
International Telecommunications Union, ITU-T Telecommunication Standardization Sector of ITU, Recommendation ITU-T Y.1540—"Internet protocol data communication service—IP packet transfer and availability performance parameters", Series Y: Global Information Infrastructure, Internet Protocol Aspects and Next-Generation Networks, Internet protocol aspects—Quality of services and network performance, Mar. 2011, 44 pp.
Jain et al., "Pathload: A Measurement Tool for End-to-End Available Bandwidth" *Proceedings of Passive and Active Measurements (PAM) Workshop*, 2002, pp. 14-25.
Melander, "Probing-Based Approaches to Bandwidth Measurements and Network Path Emulation", Dissertation for the Degree of Doctor of Philosophy in Computer Science with specialization in Computer Communication, Uppsala University, 2003, 179 pp.
Nilsson, "Measuring available path capacity using short probe trains", *2010 IEEE Network Operations and Management Symposium (NOMS)*, Apr. 19, 2010, pp. 910-913.
Prasad et al., "Bandwidth estimation: metrics, measurement techniques, and tools", *IEEE Network*, vol. 17, No. 6, Nov.-Dec. 2003, pp. 27-35.
Ribeiro et al., "pathChirp: Efficient Available Bandwidth Estimation for Network Paths" Passive and Active Monitoring Workshop (PAM 2003), San Diego, CA, Apr. 6, 2003-Apr. 8, 2003, 11 pp.
Shalunov. "RFC 4656—A One-way Active Measurement Protocol (OWAMP)",. Internet Engineering Task Force (IETF), Sep. 2006, Web <http://tools.ietf.org/html/rfc4656>, 56 pp.

* cited by examiner

METHODS AND NODES FOR IMPROVED ESTIMATION OF AVAILABLE PATH CAPACITY OF A DATA TRANSFER PATH

CROSS REFERENCE TO RELATED APPLICATIONS

This application is a 35 U.S.C. §371 national stage application of PCT International Application No. PCT/SE2012/051237, filed on 13 Nov. 2012, which itself claims priority to U.S. provisional Application No. 61/652,733, filed 29 May 2012, the disclosures and contents of both of which are incorporated by reference herein in their entirety. The above-referenced PCT International Application was published in the English language as International Publication No. WO 2013/180613 A3 on 5 Dec. 2013.

TECHNICAL FIELD

The present disclosure relates generally to data communication systems and, more particularly, to the enablement of improved estimation of available path capacity of a data transfer path of a data communication system.

BACKGROUND

The capability of estimating available capacity, end-to-end, over a data transfer path of a data communication system comprising a data network is useful in several contexts, including network monitoring and server selection. Passive estimation of available capacity of a data transfer path, such as estimation of bandwidth of an end-to-end data transfer path is possible in principle, provided all network nodes in the data transfer path can be accessed. However, this is typically not possible, and estimation of available end-to-end capacity of the data transfer path, is typically done by active probing of the data transfer path. The available capacity can be estimated by injecting data probe packets into the data transfer path, and then analysing the observed effects of cross traffic on the probe packets. This kind of active measurement requires access to sender and receiver hosts, typically data network nodes, only, and does not require access to any intermediate nodes in the data transfer path between the sending and receiving nodes. Conventional approaches to active probing require the injection of data probe packet traffic into the data transfer path of interest at a rate that is sufficient transiently to use all available capacity, and cause induced transient congestion of the data transfer path being estimated. If only a small number of probe packets are used, then the induced transient congestion can be absorbed by buffer queues in the nodes. Accordingly, no data packet loss is caused, but rather only a small data path delay increase of a few data packets. The desired measure of the available capacity is determined based on the path inter-packet delay increase. Probe packets can be sent in pairs or in trains, at various probing rates. The probing rate where the data path delay begins increasing corresponds to the point of congestion, and thus is indicative of the available capacity. Probe packets can also be sent such that the temporal separation between probe packets within a given probe packet train varies, so each probe packet train can cover a range of probing rates.

Methods using active probing are based on a model where probe packets are sent from a sending node to a receiving node in a data communication system. Typically, time stamps of the probe packets at the sender and receiving nodes are then used by an algorithm to produce estimates of the capacity of the data transfer path.

Examples of known methods for estimating capacity of a data transfer path used today include the so-called Trains Of Packet Pairs (TOPP) and Bandwidth Available in Real Time (BART) methods. The BART method can be regarded as an improvement of the TOPP method. See the document "Probing-Based Approaches to Bandwidth Measurements and Network Path Emulation" by Bob Melander, PhD Thesis, Uppsala University, 2003, for a description of TOPP and European Patent 1952579 for a further description of the BART method.

Further, the IETF IP Performance Metrics (IPPM) working group has defined two IP active measurement protocols: One-Way Active Measurement Protocol (OWAMP), RFC 4656, and Two-Way Active Measurement Protocol (TWAMP), RFC5357. OWAMP is designed for measuring one-way packet delay and one-way packet loss between two hosts. TWAMP is based on OWAMP. TWAMP is designed for measuring one-way and two-way (round-trip) packet delay and packet loss between two hosts.

In many networks, Quality of Service, QoS, mechanisms are included. Recent studies have shown that available capacity measurement methods may produce erroneous estimates in networks where QoS mechanisms are deployed, see e.g. "Available Bandwidth Measurements in QoS Environments" by Mark Bechtel and Paraskevi Thanoglou, Master Thesis, KTH, 2010.

One example of such a QoS mechanism is a traffic shaper, which is often implemented as a token bucket. A token bucket is an algorithm used in packet switched computer networks and telecommunications networks to check that data transmissions conform to defined limits on bandwidth and burstiness (a measure of the unevenness or variations in the traffic flow). The token bucket algorithm is based on an analogy of a fixed capacity bucket into which tokens, normally representing a unit of bytes or a single packet of predetermined size, are added at a fixed rate. When a packet is to be checked for conformance to the defined limits, the bucket is inspected to see if it contains sufficient tokens at that time. If so, the appropriate number of tokens, e.g. equivalent to the length of the packet in bytes, are removed ("cashed in"), and the packet is passed, e.g., for transmission. If there are insufficient tokens in the bucket the packet does not conform and the contents of the bucket are not changed. Non-conformant packets can be treated in various ways:

They may be dropped.

They may be enqueued for subsequent transmission when sufficient tokens have accumulated in the bucket.

They may be transmitted, but marked as being non-conformant, possibly to be dropped subsequently if the network is overloaded.

A conforming flow can thus contain traffic with an average rate up to the rate at which tokens are added to the bucket, and have a burstiness determined by the depth of the bucket. This burstiness may be expressed in terms of either a jitter tolerance, i.e. how much sooner a packet might conform (e.g. arrive or be transmitted) than would be expected from the limit on the average rate, or a burst tolerance or maximum burst size, i.e. how much more than the average level of traffic might conform in some finite period.

Thus, in short, if a traffic shaper (also called traffic shaping node), e.g. a token bucket is provided in a data communication system, this may have a serious effect on available path capacity measurements resulting in an overestimation of the available path capacity.

SUMMARY

It is an object to provide for a solution that enables reliable estimation of the available path capacity of a data transfer path in a data communication system deploying such a traffic shaping node.

This object is attained in a first aspect by providing a method of estimating available capacity of a data transfer path that transfers data between a sending and a receiving node of a data communication system. The method comprises the sending of one or more setting packets. One or more of the sent setting packets is/are used to set a traffic shaping node arranged in the data transfer path in a steady state. When in steady state, the traffic shaping node transmits probe packets received from the sending node towards the receiving node at an average rate for the traffic shaping node. In response to traversal of the data transfer path by the probe packets, and during the real-time operation of the data transfer path, measured data is provided for use in estimating the available path capacity of the data transfer path. The measured data from the probe packets is then used to estimate the available path capacity of the data transfer path.

An advantage with the above mentioned first aspect described is that it provides a reliable estimation of available path capacity of a data transfer path deploying a traffic shaping node in real time using active probing.

The above mentioned object is attained in a second aspect by providing a method of enabling a reliable estimation of available path capacity of a data transfer path that transfers data between a sending and a receiving node of a data communication system. The method comprises sending, from the sending node, a plurality of probe packets traversing the data transfer path during real-time operation of the data transfer path. The sending of the probe packets takes place subsequent to a sending of one or more setting packets causing a traffic shaping node arranged in the data transfer path to be set in a steady state.

The above mentioned object is attained in a third aspect by providing a sending node for enabling a reliable estimation of available path capacity of a data transfer path that transfers data between the sending node and a node of a data communication system. The sending node comprises a communications interface configured to communicate via the data communication system. The sending node further comprises a processor coupled to the communications interface and configured to send a plurality of probe packets to traverse the data transfer path during real-time operation of the data transfer path. The sending of the probe packets is to take place subsequent to a sending of one or more setting packets intended to cause a traffic shaping node arranged in the data transfer path to be set in a steady state.

An advantage with the above mentioned second and third aspects described is that they enable a reliable estimation of available path capacity of a data transfer path deploying a traffic shaping node in real time using active probing.

The above mentioned object is attained in a fourth aspect by providing a method in a traffic shaping node arranged in a data transfer path that transfers data between a sending and a receiving node of a data communication system. The method comprises receiving one or more setting packets. Upon receipt of the one or more setting packets, the traffic shaping node is set in a steady state. Probe packets, subsequently received from the sending node will then be transmitted towards the receiving node at an average rate for the traffic shaping node.

The above mentioned object is attained in a fifth aspect by providing a traffic shaping node for use in a data transfer path that transfers data between a sending and a receiving node of a data communication system. The traffic shaping node comprises a receiving unit configured to receive one or more setting packets. The traffic shaping node further comprises a logic unit configured to set, upon receipt of the one or more setting packets, the traffic shaping node in a steady state. The traffic shaping node further comprises a receiving unit configured to receive, from the sending node, a plurality of probe packets. The traffic shaping node further comprises a transmitting unit configured to transmit the probe packets towards the receiving node at an average rate for the traffic shaping node.

An advantage with the above mentioned fourth and fifth aspects described is that they enable provision of an accurate estimation of available path capacity of a data transfer path in real time using active probing.

The above mentioned object is attained in a sixth aspect by a computer readable storage medium storing computer program instructions which when executed by a processor, causes the processor to perform the methods mentioned above.

Further advantages and features of embodiments of the present disclosure will become apparent when reading the following detailed description in conjunction with the drawings.

DESCRIPTION

In this disclosure throughout, conventional terms and their abbreviations that have been considered to be well-known to the skilled person have been used as much as possible for a better understanding. Since they are considered to be well-known to the skilled person they are used without exhaustive definitions. Thus, only terms considered to require a more exhaustive explanation have been explained in more detail, often by means of concrete examples to assist understanding.

Herein, the term "capacity" includes "Available Path Capacity" (APC) as well as Tight Link Capacity" (TLC). These terms, per se, will be explained in more detail below, and is also described in ITU-T Recommendation Y.1540. The term "bandwidth" is also used interchangeably with "capacity" is the present disclosure.

All methods for measuring capacity metrics such as APC and TLC over a data transfer path of a data communication system using active probing are based on a model where probe packets are sent from a sending node to a receiving node of the data communication system. Time stamps of the probe packets at the sender and receiving node are then used by an algorithm to produce APC and TLC estimations.

Figure 1A:
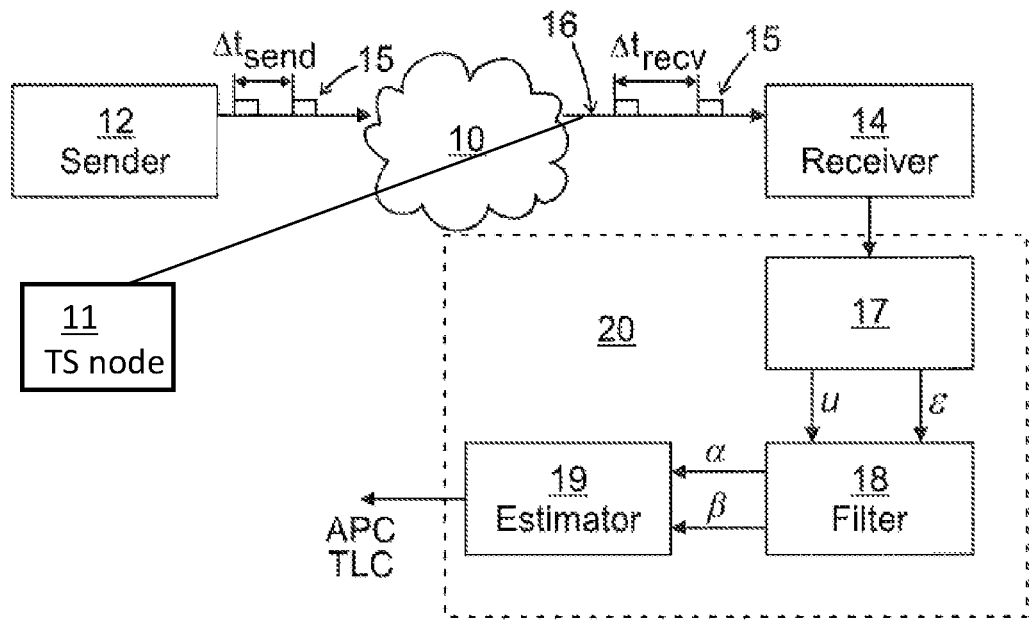
FIG. 1a is a schematic block diagram of a data transfer path of a data communication system in which embodiments of this disclosure are implemented.

Now is referred to FIG. 1a illustrating a schematic block diagram of a data communication system 10 in which embodiments of this disclosure can be implemented. The data communication system 10 comprises a data transfer path 16 that transfers data between data communication nodes for instance a sending node 12 and a receiving node 14. The sending node 12 transmits a train of probe packets 15 having a particular time interval $\Delta_{send}$ that traverse the data transfer path 16 during real-time operation of the data transfer path 16 to the receiving node 14, which receives the probe packets 15 having another particular time interval $\Delta_{recv}$ when received at the receiving node 14 because of congestion. Each train of probe packets 15 is typically sent with a different probing rate u depending on the packet size, the number of data packets per train and the time interval between the data packets. The probing rate u is defined as: u=(total number of transferred bits during $\Delta_{send}$)/$\Delta_{send}$. If the probing rate u is larger than the APC, the time interval $\Delta_{recv}$ at the receiving node 14 will be longer than at the sending node $\Delta_{send}$. The relative time difference is called strain ϵ, defined below. The sending 12 and receiving 14 nodes may be terminals, computers, servers, etc. Intermediate nodes, e.g. including traffic shapers, in the data transfer path 16 may include routers, gateways etc. Examples of the data communication system 10 may include wireless data networks and networks such as the Internet.

Before describing different embodiments of this disclosure in more detail, an explanation of the aforementioned two known methods used, namely the TOPP and BART methods will be described for a better understanding of the underlying principles of the embodiments of this disclosure. It should however be noted that the embodiments of the present disclosure is not limited to the TOPP and BART methods, but is also applicable to other active measurement methods.

The TOPP method defines the strain ϵ as:

$$\varepsilon = \frac{\Delta_{recv}}{\Delta_{send}} \quad \text{(eq. 1)}$$

while the BART method defines the strain ϵ as:

$$\varepsilon = \frac{\Delta_{recv} - \Delta_{send}}{\Delta_{send}} \quad \text{(eq. 2)}$$

In this disclosure, the strain definition from the BART method will be used as follows, but without any limitations to this particular definition. Other strain definitions such as the strain definition from the TOPP method may of course be used instead.

In a data communication system with forwarding nodes based on a first-come-first-served policy, the strain will increase linearly with the probing rate when the probing rate is larger than the APC.

Figure 1B:
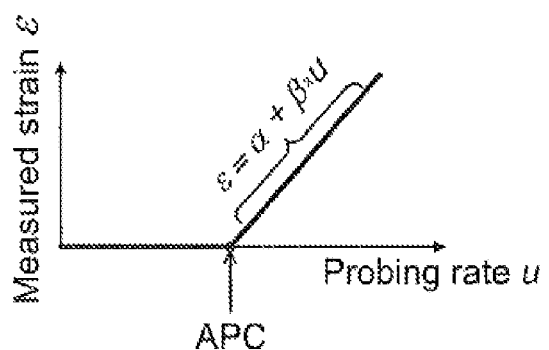
FIG. 1b graphically illustrates a piecewise linear model utilized by exemplary embodiments of the present disclosure.

Now is also referred to FIG. 1b graphically illustrating a model utilized by exemplary embodiments of the present disclosure, as well as by the known TOPP and BART methods. In the data communications system 10, such as a network, with forwarding nodes, for instance the sending and receiving node 12, 14, based on a first-come-first-served policy such as illustrated and described in FIG. 1a, the strain ϵ will increase linearly in a sloping part ϵ=α+β*u with the probing rate u when the probing rate u is larger than the APC, which is indicated with an arrow in FIG. 1b. Using BART; TLC and APC are calculated as APC=−α/β and TLC=1/β, where α and β are estimates.

An apparatus 20 shown in FIG. 1a is capable of performing the operations described above and performed when providing estimations of TLC and APC.

As described above and illustrated in FIG. 1a, to which is referred once more, probe packets 15 are provided, typically sent from the sending node 12 to the receiving node 14 in the data communication system 10. Typically, time stamps of the probe packets 15 at the sending node 12 and the receiving node 14 are used by an algorithm to produce APC and TLC estimates, and measured data of the data transfer path 16.

The data communication system 10 further comprises the apparatus 20 for estimating APC and TLC of the data transfer path 16. The data communication system 10 may constitute, or form a part of, a packet-switched data communication system including a data communication system or network, such as the Internet, a private intranet, etc. Typically, the apparatus 20 is arranged to communicate with the receiving node 14 or is contained in the same receiving node 14. Further, in case of e.g. TWAMP, the receiving node 14 and the sending node 12 are the same. The apparatus 20 comprises a data production unit 17 arranged to receive probe packets 15 that have traversed the data transfer path 16 during real-time operation of the data transfer path 16. The data production unit 17 is responsive to traversal of the data transfer path 16 by the probe packets 15 for providing, typically producing, during said real-time operation of the data transfer path 16, measured data u, and ϵ for use in estimating the APC and TLC of the data transfer path 16. The aforementioned time stamping at the sending and receiving nodes 12, 14 is not explicitly shown. The data production unit 17 is configured to extract the time stamp information and the probe packet rate u from the probe packets 15. The time stamp information may also be provided to the data production unit 17 separate from the probe packets 15. The data production unit 17, which may comprise a strain ϵ calculator, calculates an inter-packet strain value c of each pair of probe packets 15 in the received sequence of probe packets 15, and also calculates an average and variance of the inter-packet strain values ϵ.

The apparatus 20 further comprises an estimation unit 19 arranged to communicate with the data production unit 17 for producing an estimate of the APC and TLC during said real-time operation of the data transfer path 16. The estimation unit 19 is connected to, or includes, a filter arrangement 18 and is arranged to estimate the APC and TLC of a data transfer path.

According to embodiments, the data production unit 17 can, as an example, be regarded as comprising a probe packet extractor and strain calculator that ultimately produces measured data u, and ϵ for use in estimating the APC and TLC of the data transfer path, by means of the estimation unit 19.

The APC and TLC of the data transfer path 16 are sampled by transmitting probe packets 15 in a specific pattern across the data transfer path 16. Their time stamps are recorded on sending and on receiving, providing a measurement of a quantity related to the network model variables. This is repeated over and over again, for as long as it is desired to estimate the APC and TLC of the data transfer path 16.

Typically, the sending node 12 sends a train of N probe packet pairs with a probing rate u. The N probe packet pairs are used by the apparatus 20 for an inter-packet strain ϵ measurement. Some embodiments send a sequence of N+1 probe packets that are used to form N pairs of probe packets. That is, a second probe packet of a first pair is also used as a first probe packet of a second pair, and so on. In some embodiments, probe packets are not shared among the probe packet pairs, so a sequence of 2 N probe packets is used to form N distinct pairs of probe packets.

State-of-the-art APC estimation methods produce one new estimate for each probe-packet train being transmitted from a sender to a receiver. Usually the probe-packet train is a relatively short burst of packets. In prior art methods the number of packets per burst has traditionally been between 2 and 20 probe packets, e.g. 17 packets. In a QoS environment, e.g. deploying token buckets for traffic shaping, the probe-packet train may be transmitted from the token bucket as a burst, i.e. much faster than a rate r associated with the token bucket. This means that there will be no observation of strain for these bursted packets. This causes problems for APC estimation methods, as described above, since at the receiver there will be no observed effect of the rate limiting mechanism in the network and therefore the APC method will overestimate the APC.

As previously mentioned an example of a quality of service mechanism is a traffic shaper implemented as a token bucket function in a network node. A token bucket algorithm will be described in the following. Tokens are added to the bucket with a rate r, i.e. every 1/r second. When a packet with size s arrives at the bucket, assuming s<n where n is the number of tokens in the token bucket, s tokens are removed from the bucket and then the packet is forwarded. If s>n no tokens will be removed from the bucket, instead the packet is considered non-conformant. Non-conformant packets can for example be sent at a later stage when enough tokens are available. The above example assumes that one token corresponds to 1 bit—this is however implementation specific and one token may e.g. correspond to the size of one or more maximum transmission units, MTUs, which is approximately 1500 bytes for IP packets.

Figure 1C:
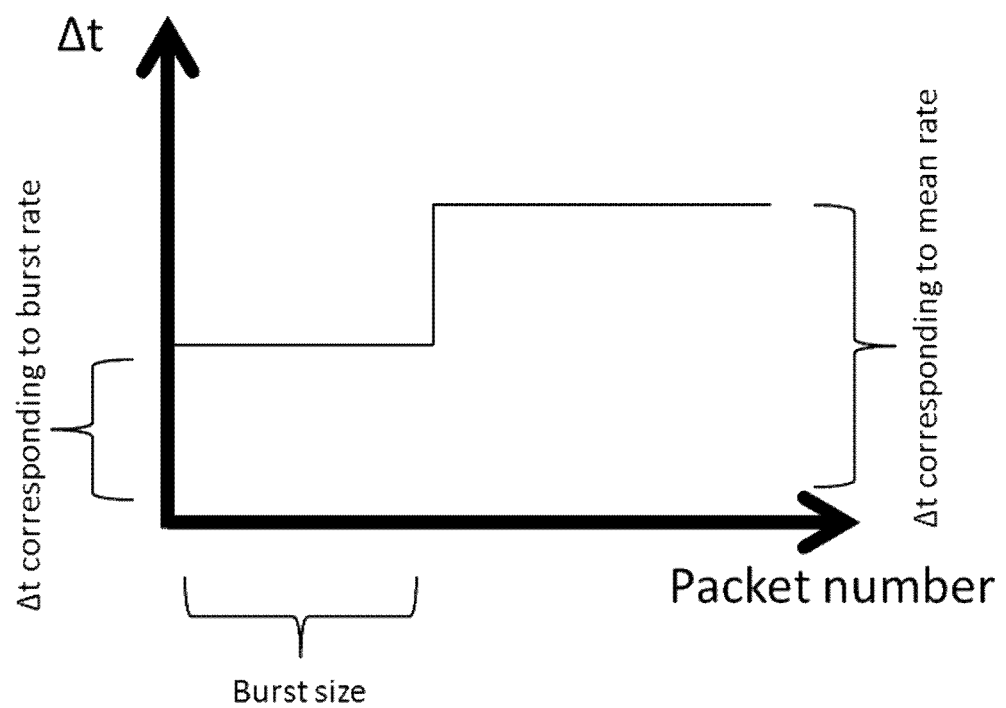
FIG. 1c is a diagram that schematically illustrates how the time differences between adjacent received packets vary.

According to embodiments of the present disclosure we modify one or more nodes of the system and let a set of one or more setting packets affect the network and put it in a state which enables a subsequently sent train of probe packets to be used for measuring the APC in a more correct way. In the initial (init) state, i.e. when tokens are available, the token bucket of the traffic shaping node 11 may forward packets at line rate, while when being in the steady state each packet is rate limited according to the rate r of the traffic shaping node 11 i.e. the packets are transmitted at an average rate for the traffic shaper. The probe packets traversing the traffic shaper in steady-state may then be used for reliable APC and TLC measurements, and thereby the risk of overestimation is limited. This is further illustrated in FIG. 1c that schematically illustrates how time differences between adjacent received packets may vary when the traffic shaping node 11 is included in the data transfer path 16. In this case all packets for which the time difference values are determined are sent with a same inter-packet delay. As shown in the FIG. 1c, the time difference values make up a step function $f(\Delta t)$, being equal to $\Delta t\_burstrate$ for a first set of packets, which packets corresponds to the setting packets; and being equal to $\Delta t\_meanrate$ for a second set of packets, which packets corresponds to the probe packets. The setting packets thus have time difference values $\Delta t$ that essentially corresponds to the burst rate of the traffic shaper 11, whereas the probe packets 15 received in the receiving node 14 have time difference values $\Delta t$ that essentially corresponds to the average rate of the traffic shaper 11. Providing APC estimations on the first set of packets would lead to overestimation since these packets are transmitted from the traffic shaper 11 at burst rate, and the rate limiting function of the traffic shaper 11 is set aside. However providing APC estimations on the second set of packets would lead to a correct APC estimation since these packets are transmitted from the traffic shaper 11 when in steady-state and thus at an average rate for the traffic shaper 11. Thereby the rate limiting function of the traffic shaper 11 will be considered for these second set of packets in the APC estimations resulting in more reliable APC estimations of the data transfer path 16.

The average rate may also be called a steady-state rate. In case there is no ongoing traffic, apart from the probe packets 15, the average rate may also be called a Committed Information Rate (CIR) and the burst rate may be called Peak Information Rate (PIR). The CIR may also be defined as burst size divided by burst time. More specifically, according to one embodiment, if a token bucket contains n tokens, each token having a size of 1 bit, the train of setting packets needs a length of at least n bits, thereafter the number of probe packets needed for calculating the APC will traverse the traffic shaper 11. The packet train sent from the sending node 12 will thus comprise a sub train of setting packets and a sub train of probe packets; this is further illustrated in FIG. 4a. The setting packets will be forwarded as a burst while the rest of the packets, i.e. the probe packets, will experience the rate limiting functionality of the token bucket. While forwarding the setting packets of the packet train new tokens may be created in the token bucket at the rate r. So, the number of bits needed to move from init state to steady state should be the maximum burst size=$b*C/(C-r)$, where b is the size of a token bucket, r is the token rate, i.e. average rate of the token bucket, and C is a maximum rate from the token bucket, e.g. the line rate of a transmitting interface of a node comprising the token bucket. In case other packets (from other traffic) are affecting the token bucket, fewer bits will be needed in order to move from init state to steady state. On the receiver side, only the latter part of the train, i.e. the probe packets, is used for APC estimation. The first part of the train, i.e. the setting packets, thus corresponds to the maximum burst size of the token bucket, and the second part of the train, i.e. the probe packets, is used for measuring the APC. According to an embodiment, a first, or all, of the probe packets comprise an indicator, e.g. a flag or similar, indicating that the packet(-s) is/are probe packets.

Configuration parameters for the token bucket, such as burst size, may be obtained by knowledge of operator settings or by network measurements performed e.g. as described in co-pending European patent application number 12189033.

According to embodiments, control and/or management plane functionality is utilized in order to configure the operation of the traffic shaping node 11. This may require additional functionality in the traffic shaping node 11. The configuration of this traffic shaping node 11 may be done via a control and/or management plane interface. A packet received in the traffic shaping node 11 is analyzed. If the received packet is a setting packet, the traffic shaping node 11 will switch to steady state and received probe packets will be transmitted at an average rate for the traffic shaping node 11. The traffic shaping node 11 may identify setting packets using filtering rules. The filtering can e.g. be based on protocol type, port numbers or any other property of a packet. According to embodiments, the setting packet(-s) comprise an indicator indicating that the traffic shaping node 11 should be set in a steady state and may also comprise an indicator indicating that the packet(-s) is/are a probe packet.

In case of a token bucket application, normal traffic not used for measurements, are treated with token bucket parameters b (bucket size) and r (rate) being preconfigured or set via a control/management interface. After receipt of a setting packet, the traffic shaping node 11 is switched to steady state, whereby probe packets may instead be put into a separate token bucket, that rate limits all packets at an average rate for the traffic shaping node 11. That is, no bursts are allowed. This can be accomplished by setting the bucket size b=s, where s is the packet size of the probe traffic.

Figure 2A:
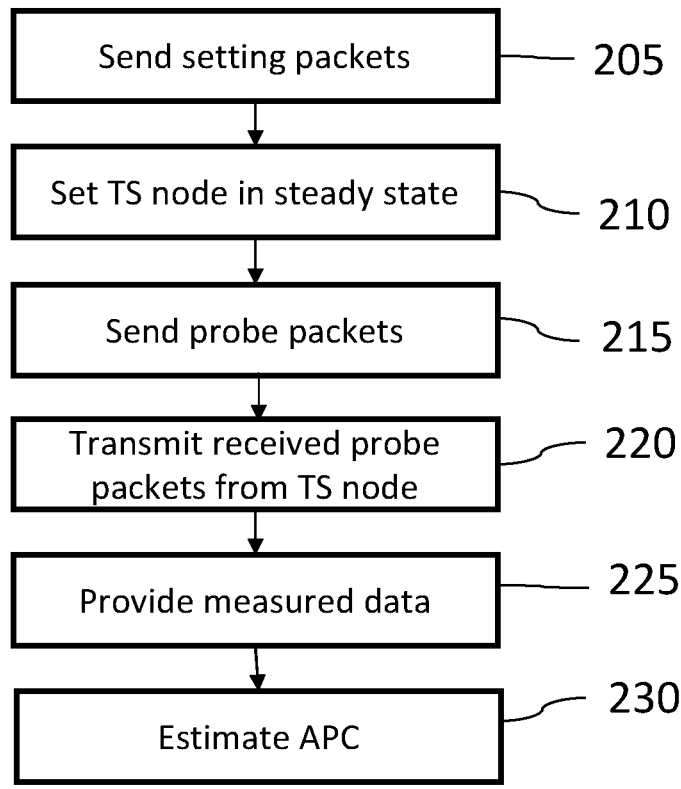
FIG. 2a is a flow diagram illustrating an embodiment of a method in a data communication system.
Figure 2B:
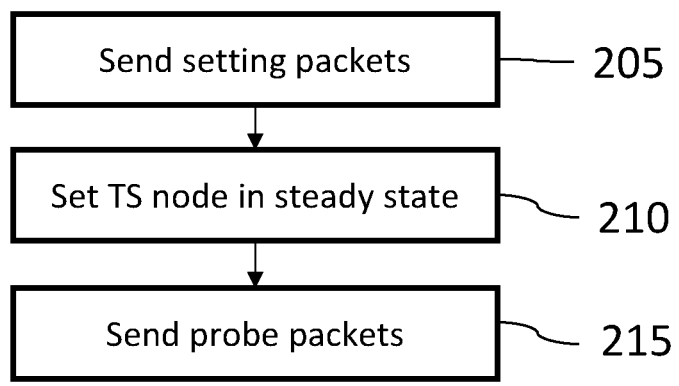
FIG. 2b is a flow diagram illustrating an embodiment of a method in a data communication system.

A procedure for estimating available path capacity in a data transfer path comprising the traffic shaping node 11, will now be described with reference to the flow charts in FIGS. 2a and 2b. Referred is also to FIGS. 4a and 4b in which different trains comprising setting packets 15a and probe packets 15b are illustrated.

In an action 205, setting packets are transmitted from a node, preferably the sending node 12. If the setting packets are transmitted from the sending node 12, the setting packets traverse the data transfer path during real-time operation of the data transfer path. In an action 210, one or more of the sent setting packets is/are used to set the traffic shaping node 11 arranged in the data transfer path 16 in a steady state. The setting packets are thus configured to set the traffic shaping node in a steady state, e.g. as described below with reference to FIGS. 4a and 4b.

In an action 215 the sending node 12 transmits a plurality of probe packets on the data transfer path 16 in order for the probe packets to be subsequently transmitted from the traffic shaping node 11 at an average rate for the traffic shaping node 11. It should be noted that the action 215 may be performed prior to action 210; i.e. the probe packets may be sent before actually setting the traffic shaping node 11 in a steady state. The sending of the setting packets and the probe packets enable a reliable estimation of the APC in the data transfer path 16 since the setting packets transform the traffic shaping node 11 into a steady-state and the probe packets will then experience the rate limiting functionality of the traffic shaping node 11.

Thus, when in steady state the traffic shaping node 11 transmits probe packets received from the sending node 12 towards the receiving node 14 at an average rate for the traffic shaping node in an action 220. In response to traversal of the data transfer path by the probe packets, and during the real-time operation of the data transfer path, measured data, such as inter-packet separation, or rate u and strain ε, is provided in the receiving node 14, or in an apparatus/node 20 communicating with the receiving node 14, in an action 225. The measured data from the probe packets is then used to estimate the available path capacity of the data transfer path 16 (preferably as described above with reference to FIG. 1a) in an action 230.

According to embodiments the setting packets 15a may be transmitted from another node, separate from the sending node 12, arranged in the data communication system 10. This may however require that the sending node 12 and this other node are in synchronization so that the probe packets 15b are received in the traffic shaping node 11 when in steady-state. I.e. the sending 215 of the probe packets 15b should take place subsequent to the sending 205 of the setting packets 15a causing the traffic shaping node 11 arranged in the data transfer path 16 to be set 210 in a steady state.

According to embodiments the setting packets have an average rate exceeding an average rate of the probe packets. By transmitting the setting packets at a high rate with a small inter-packet time value, a token bucket will be emptied quickly and thus rapidly transform the traffic shaper into a steady-state. Thereby fewer setting packets needs to be transmitted since the creation of new tokens in the token bucket will have a small impact when transforming the traffic shaping node 11 from initial state to steady-state.

According to embodiments the setting packets have a rate and total size sufficient to set the traffic shaping node 11 arranged in the data transfer path 16 in a steady state. Thereby, all probe packets sent subsequent to the setting packets may be used in order to provide path capacity measurements.

According to embodiments the setting packets have a total size exceeding $b*C/(C-r)$, where b is the size of a token bucket of the traffic shaping node and r is the token rate and C is the maximum transmission rate, i.e. the burst rate, from the traffic shaping node 11. Thereby, it will be rather certain that the setting packets will set the traffic shaping node 11 in a steady state.

For example, assume a traffic shaping node 11 in the data transfer path 16 with the following parameters b=120000 bits corresponding to 10 packets and every packet is 12000 bits), C=1 Gbps, r=120 kbps, i.e. 10 packets can be sent from the traffic shaping node every second in steady state. The APC would then have a maximum value of 120 kbps. Now, assume that setting packets are sent from the sending node 12 at a rate of 10 packets per second, i.e. equal to r, the setting packets alone would never be able to empty the bucket since the rate of adding tokens is also 10 packets per second. However, if the setting packets are sent at a rate of 100 packets per second (1.2 Mbps or 10*r), the setting packets would empty the bucket after a time equal to b/(setting packet rate−r)=120000 bits/(1.2 Mbps-120 kbps)=0.11 seconds, and if the setting packets are sent at a rate of 1000 packets per second (12 Mbps or 100*r) the bucket would be emptied after 0.01 seconds. After the setting packets have set the traffic shaping node in a steady-state, the probe packets are transmitted from the traffic shaping node at an average rate, which average rate depends on the capacity measurement method, e.g. the BART method sends the probe packets from the sending node 12 at a rate in the vicinity of the steady-state rate (e.g. in an interval $0.5*r-1.5*r$) for the traffic shaping node 11 in order to get a good estimation of the APC.

It should be noted that the setting packets and the probe packets may have a same size but may also have a different size.

Figure 3:
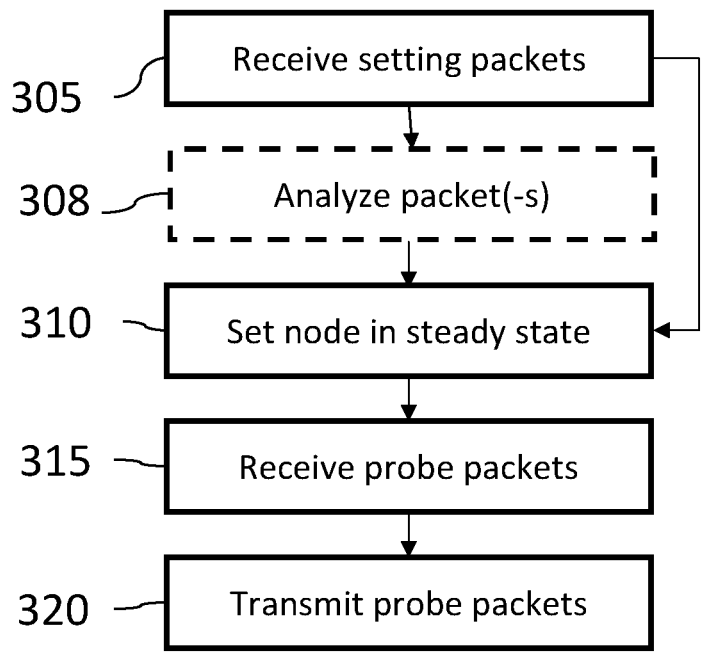
FIG. 3 is a flow diagram illustrating an embodiment of a method in a traffic shaping node.

A procedure for handling probe packets in the traffic shaping node 11 will now be described with reference to the flow chart in FIG. 3.

In an action 305, one or more setting packets transmitted from a node of the system are received in the traffic shaping node 11. In an action 308 the received packets may be analyzed, after which analysis the traffic shaping node 11 determines that the traffic shaping node 11 should be set in a steady state. This determination is preferably based on an indicator in one or more of the setting packet(-s). The traffic shaping node 11 may thus be determined to be set in a steady state based on an indicator in the one or more of the setting packets. In an action 310 the traffic shaping node is set in steady state. All probe packets subsequently received in an action 315 will then be transmitted to the receiving node 14 at an average rate for the traffic shaping node 11 in an action 320. The procedure described with reference to FIG. 3 is thus a method in the traffic shaping node 11 that provides transmission of probe packets from the traffic shaping node 11 at an average rate for the traffic shaping node 11, and thus provides a method that enables a reliable estimation of the APC of the data transfer path.

Figure 4A:
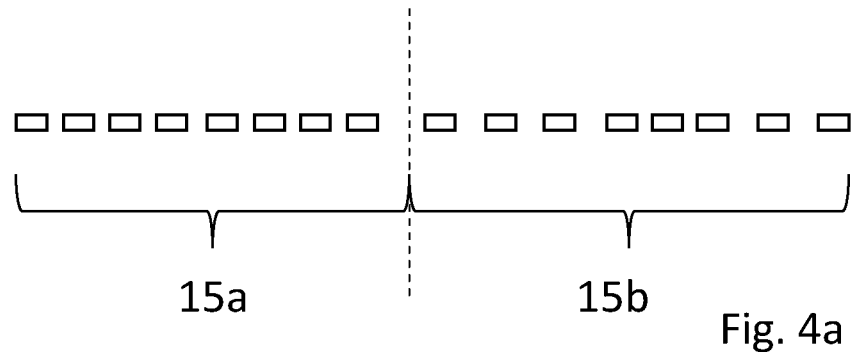
FIGS. 4a and 4b illustrates different trains of probe and setting packets.
Figure 4B:
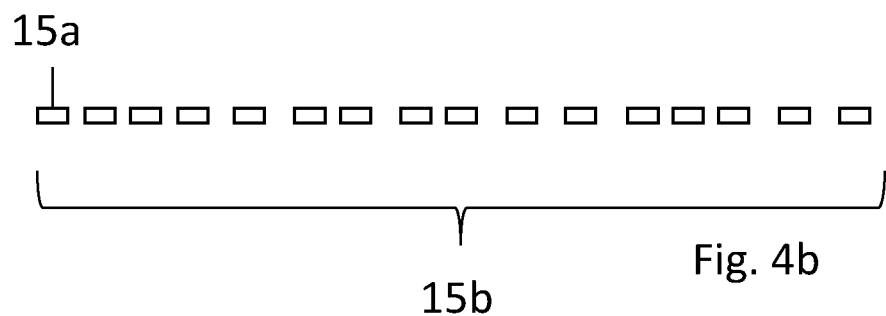

FIGS. 4a and 4b illustrate different trains of setting packets 15a and probe packets 15b. FIG. 4a illustrates a first set of a plurality, N, of setting packets 15a where the setting packets are sent at a rate significantly exceeding an expected APC of the data transfer path 16 or an expected token bucket average rate, e.g. at line rate, net bit rate or gross bit rate. Note that the total size of setting packets should be enough to exceed the remaining size of the token bucket, i.e. the total size of the token bucket minus the size of the tokens removed because of other traffic traversing the traffic shaping node, in case of a token bucket application. E.g. the size of the setting packets could be N*s>n, where n=number of tokens in the token bucket times the size of the tokens and s=average size of the setting packets. Directly, or shortly, after the first train of setting packets 15a, a second train of M probe packets 15b are sent at a rate selected by the actual capacity estimation method. According to embodiments, the probe packets are sent back-to-back with the setting packets in order not to let the token bucket fill up with new tokens again. For e.g. BART the rate is randomized between a preconfigured minimum and maximum rate. Time stamps from the second train of probe packets 15b are then used to estimate APC. According to an embodiment at least one of the probe packets comprises an indicator indicating that it is a probe packet. This in order for a node providing the measured data to know when to start and/or stop the provision of measured data.

FIG. 4b illustrates a first set of setting packets 15a consisting of one setting packet 15a. In this example the setting packet 15a comprises an indicator indicating that the traffic shaping node should be set in a steady state or similar. Thereby, the traffic shaping node 11 may switch to steady state upon determining that probe packets are traversing (or will traverse) the traffic shaping node 11.

The setting packet 15a may also comprise an indicator indicating that the packet is a probe packet in which case the setting packet 15a is also a probe packet 15b, and consequently part of the probe packet train 15b. Thus, both the setting packet and the probe packets are probe packets from which the measured data for use in estimating the available path capacity is provided. This assumes that both the setting and probe packets are transmitted from the traffic shaping node 11 when the traffic shaping node 11 is in steady state and thus that the setting packets comprise at least one packet comprising an indicator indicating that the traffic shaping node should be set in a steady state. This leads to an efficient use of the bandwidth of the data transfer path since merely one or at least a few packets will be used to put the traffic shaping node 11 in a steady state.

In case the sending node 12 and the receiving node 14 is a same node, e.g. in case TWAMP is used, the same node should be aware of what packets are probe packets and what packets are setting packets and other packets. In case the sending node 12 and the receiving node 14 is not the same node, e.g. OWAMP, the receiving node 14, or at least the apparatus 20 performing the APC/TLC estimations, should be able to determine which probe packets that are to be used in the estimations.

The first, or all, of the probe packets may comprise indicators indicating it to be a probe packet and/or its position in the probe packet train. Similarly, the last of the probe packets may indicate that it is the last packet of the probe packet train. Further, the sending node 12 may inform the receiving node 14 of the length/size of the train of setting packets by e.g. adding this information in an extra field in a control protocol.

Figure 5:
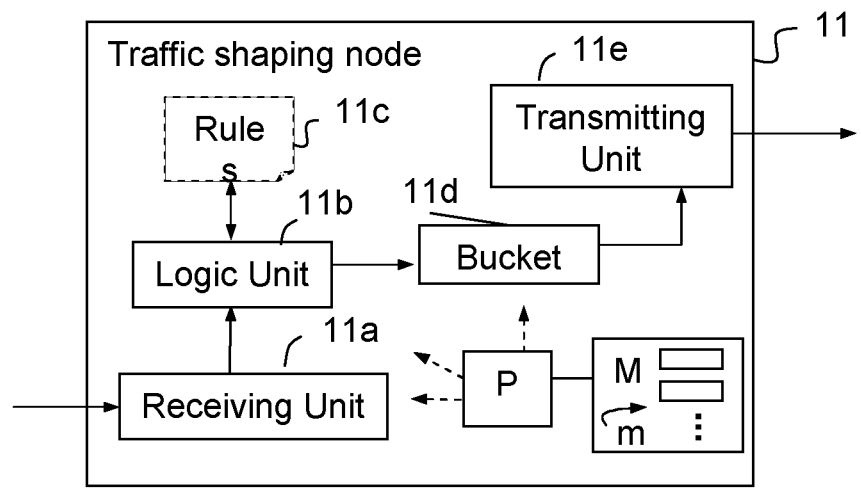
FIG. 5 is a block diagram illustrating an embodiment of a traffic shaping node.

A detailed but non-limiting example of how the traffic shaping node 11 may be configured to accomplish the above-described solution, is illustrated by the block diagram in FIG. 5. The traffic shaping node 11 is configured to support the handling of probe packets in accordance with the procedures described above for FIGS. 2-4, respectively. The traffic shaping node 11 will now be described in terms of a possible example of employing the solution.

The traffic shaping node 11 comprises a receiving unit 11a configured to receive one or more setting packets 15a issued from the sending node 12 during real-time operation of the data transfer path 16. The receiving unit 11a is further configured to receive a plurality of probe packets issued from the sending node 12.

The traffic shaping node 11 also comprises a logic unit 11b configured to set the traffic shaping node 11 in a steady state upon receipt of the one or more setting packets 15a. The logic unit 11b may also be configured to identify setting packets using filtering rules 11c. The filtering rules can e.g. be based on protocol type, port numbers or any other property of a setting packet.

The traffic shaping node 11 may also comprise a bucket 11d. The traffic shaping node 11 may also comprise two token buckets, one for measurement traffic, i.e. probe packets, and one for ordinary traffic. The logic unit 11b directs each packet to the correct token bucket using the filtering rules 11c.

The traffic shaping node 11 also comprises a transmitting unit 11e configured to transmit the probe packets 15b towards a receiving node 14 at an average rate for the traffic shaping node 11.

The functional units 11a-e described above can be implemented in the traffic shaping node 11 by means of program modules of a respective computer program comprising code means which, when run by a processor "P" causes the traffic shaping node 11 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise storage for caching purposes.

Each computer program may be carried by a computer program product in the traffic shaping node 11 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the traffic shaping node 11.

The traffic shaping node 11 may thus also be described as a device 11 for use in a data transfer path that transfers data between a sending 12 and a receiving 14 data communication node of a data communication system 10. Wherein the device comprising: a communications interface configured to communicate via the data communication system; and a processor coupled to the communications interface and configured to perform the steps described with reference to FIG. 3. I.e. configured to: receive one or more setting packets that traverse the data transfer path during real-time operation of the data transfer path; set, upon receipt of the one or more setting packets, the device in a steady state; receive, from the sending node, a plurality of probe packets; and transmit, the probe packets towards the receiving node at an average rate for the traffic shaping node.

The methods and nodes of the present disclosure can produce an updated estimate of APC and TLC for each new sampling of the system, i.e. for each new train of probe packets. The trains may be sent arbitrarily often (i.e., the time scale for the sampling measurement can be reduced arbitrarily), so the available capacity such as the bandwidth of the data transfer path may be tracked in real time.

Data processing and memory requirements for performing the above-described estimations can be met relatively easily. For example, in some embodiments the receiving node 14 of FIG. 1a is a microprocessor platform into which the embodiments of the apparatus 20 can be provided. Alternatively, the apparatus 20 may also be configured by processing circuitry, for instance containing a processor and corresponding memory configured to perform the method according to the various embodiments described.

Figure 6:
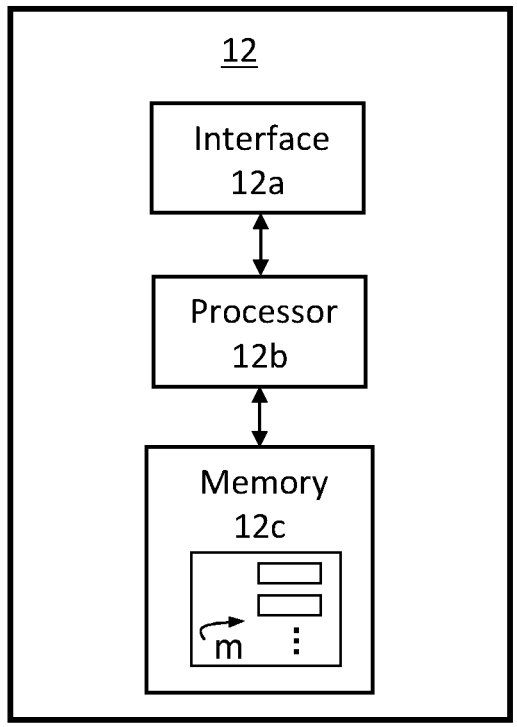
FIG. 6 is a block diagram illustrating an embodiment of a sending node.

The data communication system 10 further comprises a sending node 12, illustrated in FIG. 6, for enabling a reliable estimation of available path capacity of a data transfer path 16 that transfers data between the sending node 12 and the receiving node 14, also referred to as data communication nodes, of the data communication system 10. The sending node 12 comprises a communications interface 12a configured to communicate via the data communication system 10. The sending node 12 further comprises a processor 12b coupled to the communications interface 12a and configured to perform at least action 215 subsequent to, e.g. in response to, setting packets 15a being sent from a system node in action 205 causing the traffic shaping node 11 arranged in the data transfer path 16 to be set in a steady state in action 210. I.e. to send a plurality of probe packets 15b to traverse the data transfer path during real-time operation of the data transfer path 16, wherein said sending 215 is performed subsequent to one or more setting packets 15a being sent, the one or more setting packets causing a traffic shaping node 11 arranged in the data transfer path 16 to be set in a steady state. The plurality of probe packets is to be used for estimation of APC and/or TLC.

The processor 12b of the sending node 12 may be provided as a dedicated circuit such as a digital signal processor (DSP) or an Application Specific Integrated Circuit (ASIC). As an alternative it may be provided in the form of a processor with associated program memory including computer program code for performing the functionality. This computer program may also be a computer program product, for instance in the form of a computer readable storage medium or data carrier, like a CD ROM disc or a memory stick, carrying such a computer program with the computer program code, which will implement the function of the above-described module when being loaded into the sending node 12. Each such computer program may be carried by a computer program product in the sending node 12 in the form of the memory 12c having a computer readable medium and being connected to the processor 12b. The computer program product or a memory 12c thus comprises a computer readable medium on which the computer program is stored e.g. in the form of computer program modules "m".

For example, the memory 12c may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the sending node 12.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of estimating available path capacity of a data transfer path that transfers data between a sending node and a receiving node of a data communication system, the method comprising:
    sending one or more setting packets, wherein the one or more setting packets is/are used to set a traffic shaping node arranged in the data transfer path in a steady state;
    transmitting, from the traffic shaping node, probe packets received from the sending node, towards the receiving node at an average rate for the traffic shaping node;
    providing, in response to traversal of the data transfer path by the probe packets, and during the real-time operation of the data transfer path, measured data for use in estimating the available path capacity of the data transfer path; and
    estimating the available path capacity of the data transfer path using the measured data from the probe packets.

2. A method of enabling a reliable estimation of available path capacity of a data transfer path that transfers data between a sending node and a receiving node of a data communication system, the method comprising:
    sending, from the sending node, a plurality of probe packets traversing the data transfer path during real-time operation of the data transfer path, said sending taking place subsequent to a sending of one or more setting packets causing a traffic shaping node arranged in the data transfer path to be set in a steady state.

3. The method according to claim 1, wherein the one or more setting packets have an average rate exceeding an average rate of the probe packets.

4. The method according to claim 1, wherein the one or more setting packets have a rate and total size sufficient to set the traffic shaping node arranged in the data transfer path in the steady state.

5. The method according to claim 4, wherein the one or more setting packets has a total size exceeding $b*C/(C-r)$, where b is the size of a token bucket of the traffic shaping node and r is a token rate and C is a maximum rate from a transmitting unit of the traffic shaping node.

6. The method according to claim 1, wherein at least one of the probe packets comprise an indicator indicating that it is a probe packet.

7. The method according to claim 1, wherein at least one of the one or more setting packets comprise an indicator indicating the traffic shaping node to transfer to the steady state.

8. The method according to claim 7, wherein the one or more setting packets is/are probe packets from which the measured data for use in estimating the available path capacity is provided.

9. The method according to claim 1, wherein information of the one or more setting packets is provided to the receiving node by information in a field of a control protocol.

10. The method according to claim 1, wherein the one or more setting packets are sent from the sending node traversing the data transfer path during the real-time operation of the data transfer path.

11. A sending node for enabling estimation of available path capacity of a data transfer path that transfers data between the sending node and a receiving node of a data communication system, the sending node comprising:
    a communications interface configured to communicate via the data communication system; and a processor coupled to the communications interface and configured to:

send a plurality of probe packets to traverse the data transfer path during real-time operation of the data transfer path, wherein said sending is to take place subsequent to a sending of one or more setting packets intended to cause a traffic shaping node arranged in the data transfer path to be set in a steady state.

12. A method in a traffic shaping node arranged in a data transfer path that transfers data between a sending node and a receiving node of a data communication system, the method comprising:

receiving one or more setting packets;

setting, upon receipt of the one or more setting packets, the traffic shaping node in a steady state;

receiving, from the sending node, a plurality of probe packets; and transmitting, the probe packets towards the receiving node at an average rate for the traffic shaping node.

13. The method according to claim 11, further comprising:

analyzing the one or more of the setting packets and determining to set the traffic shaping node in the steady state based on an indicator in the one or more of the setting packets.

14. A traffic shaping node for use in a data transfer path that transfers data between a sending node and a receiving node of a data communication system, the traffic shaping node comprising:

a receiving unit configured to receive one or more setting packets;

a logic unit configured to set, upon receipt of the one or more setting packets, the traffic shaping node in a steady state;

a receiving unit configured to receive, from the sending node, a plurality of probe packets; and a transmitting unit configured to transmit the probe packets towards the receiving node at an average rate for the traffic shaping node.

15. A computer program product comprising a non-transitory computer readable storage medium storing computer program instructions which when executed by a processor, causes the processor to perform a method as set out in claim 1.

* * * * *